Figures 1, 2:
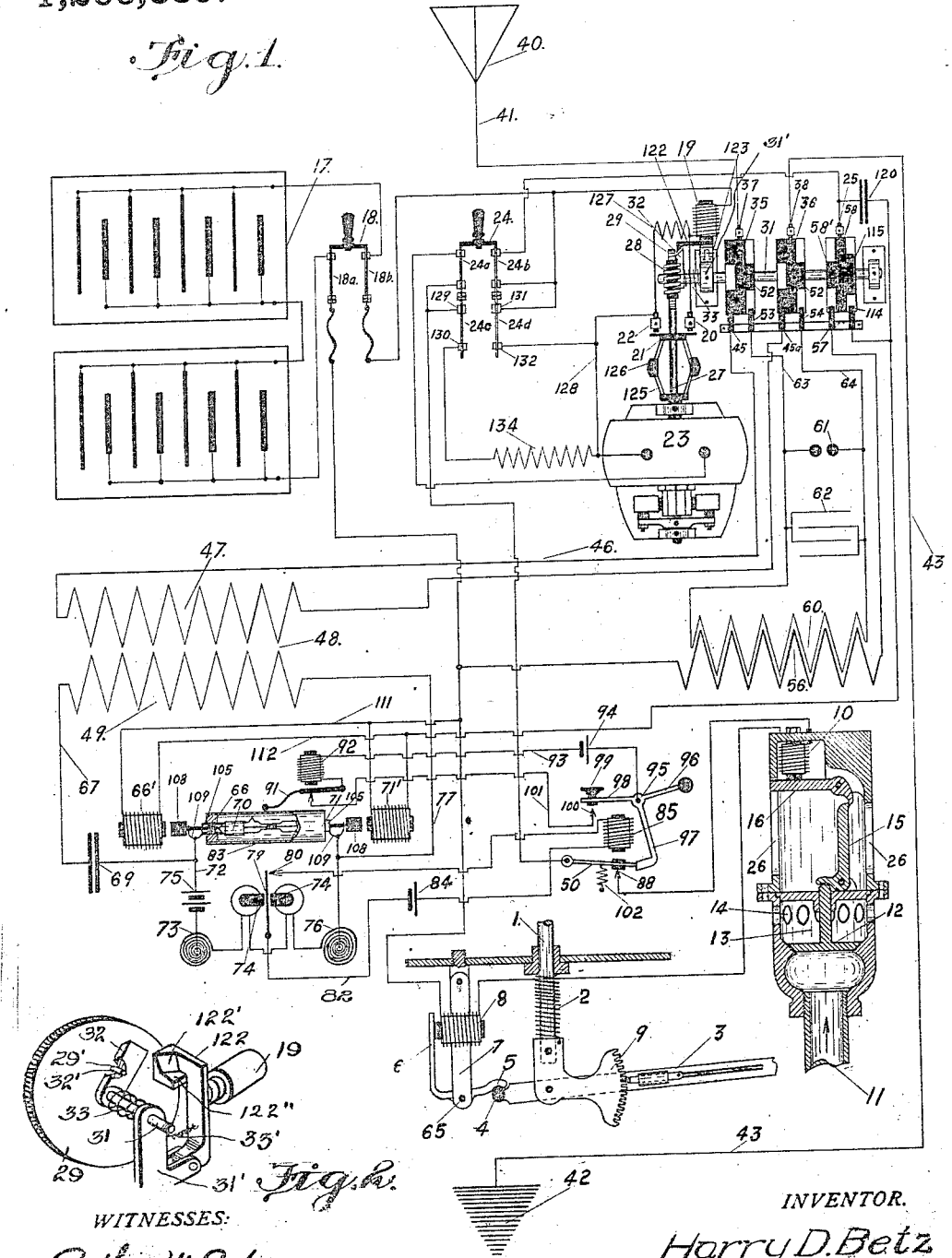

H. D. BETZ.
AUTOMATIC WIRELESS APPARATUS FOR PREVENTING COLLISIONS.
APPLICATION FILED DEC. 20, 1913.

1,266,389.

Patented May 14, 1918.

WITNESSES:
Arthur W. Capa.
Lyman A. Robinson.

INVENTOR.
Harry D. Betz
BY
ATTORNEY.

UNITED STATES PATENT OFFICE.

HARRY D. BETZ, OF KANSAS CITY, MISSOURI.

AUTOMATIC WIRELESS APPARATUS FOR PREVENTING COLLISIONS.

1,266,329.　　　Specification of Letters Patent.　　Patented May 14, 1918.

Application filed December 20, 1913. Serial No. 807,905.

*To all whom it may concern:*

Be it known that I, HARRY D. BETZ, a citizen of the United States, residing at Kansas City, in the county of Jackson and State of Missouri, have invented certain new and useful Improvements in Automatic Wireless Apparatus for Preventing Collisions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wireless apparatus for automatically stopping a railway locomotive, car, vessel, or other mechanically driven vehicle to prevent its collision with another properly equipped locomotive, car, vessel or other mechanically driven vehicle, and for the prevention of other accidents, such as a locomotive running through an open switch, or the like, and comprises means adapted for mounting on locomotives, cars, vessels and other mechanically driven vehicles, for receiving and sending Hertzian waves, and apparatus adapted for mounting at fixed stations for sending Hertzian waves to be received by the apparatus on moving stations when the latter enters the danger zone of the sending apparatus; the principal object of the invention being to provide an apparatus of this character which is wholly automatic in its action, thus providing a device for the prevention of collisions and other accidents by automatically stopping locomotives, cars, vessels and other mechanically driven vehicles independently of human agencies and their liability to err.

It is also an object of my invention to provide an apparatus of this character by means of which the throttle of a locomotive will be automatically closed, the air line opened and provision made automatically, for the continuous sending out of Hertzian waves and whereby the power controlling device or mechanism of any mechanically propelled car, vessel or other vehicle will be automatically operated so as to shut off the propelling power, or reverse the same as may be necessary, and automatically operate the brakes or other speed retarding device or mechanism thereon and provision made automatically for the continuous sending out of Hertzian waves.

The above being accomplished automatically by the receipt of Hertzian waves from coöperating apparatus, either stationary or moving, creating a so-called dangerous zone, which zone is limited by the strength of the transmitting power of such coöperating apparatus, and affecting the receiving instruments of the apparatus on a moving station when it enters within such dangerous zone; thus setting the receiving instruments of the apparatus of such moving station and breaking the main battery circuit thereof, so that the steam of the locomotive or the propelling power of the car, vessel, or other mechanically driven vehicle, will be cut off, and, if necessary, reversed; the brakes of the locomotive or other speed retarding device or mechanism of the car, vessel, or other mechanically driven vehicle applied, bringing the locomotive, car, vessel, or vehicle to a stop, and the transmitting instruments of the apparatus mounted thereon compelled to send out Hertzian waves continuously in order to prevent the near approach from any direction of another similarly equipped locomotive, car, or vessel, or other mechanically driven vehicle. The three above named functions are accomplished entirely automatically on the receipt of the wireless waves from any coöperating station.

In carrying out my invention, in its application to or use on a locomotive, I provide apparatus for mounting on the locomotive comprising a battery and electromagnets for retaining the locomotive throttle in operative position and the air line closed, together with electrical circuits, whereby the circuits from the main battery through the throttle, air line valve and clutch magnets may be broken to release the throttle, the air valve retaining lever and the clutch automatically, immediately upon receipt of the Hertzian waves from the transmitting or sending instruments of a coöperating apparatus, upon entrance into the dangerous zone of a coöperating apparatus. I also vary the receiving and sending or transmitting periods of the apparatus mounted on different locomotives in order to obviate synchronism and liability of inoperativeness. The dangerous zone above mentioned being the zone or radius within which an apparatus on one locomotive may pick up waves sent out by the apparatus on another locomotive or from a fixed station; it being apparent that the so-called dangerous zone may be enlarged or decreased by varying the strength of the transmitting power of the apparatus.

In Figure I of the drawings, wherein one form of the invention is illustrated, I show a complete sending and receiving outfit, together with means for automatically alternating the periods of sending and receiving, which may be mounted on a locomotive and includes the throttle and air line control; the throttle and air line mechanism being included to illustrate the operation of the apparatus.

Fig. II is a detail view of the clutch mechanism.

In the drawings—

1 designates the throttle valve rod of a locomotive, or the like, which is yieldingly tensioned to closed position by a spring 2, and 3 the throttle lever which is pivotally connected with the rod 1 and has a fulcrum member 4 adapted to bear within a seat 5 of an armature lever 6; which fulcrums on a standard 7 that is rigidly mounted adjacent the throttle valve rod and is adapted to be held in operative position by a magnet 8 in the main battery circuit hereinafter described.

The throttle valve lever is projected through a quadrant 9, so that when the fulcrum member of the lever is seated, the throttle may be operated in the ordinary manner.

11 designates the main air line for serving the brakes of the locomotive and train with which it is connected, and having an auxiliary valve 12 that is located within a chamber 13, having a plurality of permanently open apertures 14, through which air may escape to the atmosphere when the valve is unseated by pressure of air within the train pipe 11.

A lever 15 is pivoted adjacent the valve 12 and normally engaged by the hooked end of an armature 16 to retain the lever in operative position, and the valve seated when the magnet 10 is energized, and which is adapted to release the lever when the magnet is deënergized to allow the valve to open under pressure of the air in the train air line assisted by gravity of the weighted end of the armature.

The chamber 13 has openings 26 adjacent the lever 15, through which access may be had to the lever and armature to restore the parts to operative position after they have been released by the magnet.

From the foregoing description, it will be understood that when the magnets 8 and 10 are in circuit with the main battery, the armature 6 is held by the magnet 8, so that the fulcrum member 4 of the throttle lever may seat thereon, but that when the circuit is broken, tension of the spring 2 will throw the throttle valve rod inwardly and tip the armature member 6, so that the lever 3 will be released and allow the throttle to close automatically, and that when the circuit is closed, the air line valve will be held seated by the magnet, so that the air line is closed, but that when the circuit is broken, the air line will be automatically opened by the unseating of the valve 12 to allow the train pipe air to escape to atmosphere.

It is also apparent, that while the throttle and usual air valves may be operated in the usual manner, when the apparatus is in working order, it is necessary to first close the circuit through the magnets before the locomotive carrying the apparatus may be started.

In carrying out my invention, I provide a main battery, generator, or both for energizing the throttle, air line and clutch magnets, and wireless apparatus and circuits for breaking the main battery circuit, in order to deënergize the magnets, one form of such apparatus comprising a drum flasher for making and breaking the receiving and sending circuits, a motor for operating the flasher, and any receiving set properly protected and capable of operating a relay to control the main battery or generator circuit, as above mentioned.

In order to better describe the apparatus and various circuits, I will give such description in connection with a specific illustration of use of the apparatus.

The batteries for energizing the controlled circuit may consist of ordinary storage batteries 17, or a suitable generator, or both, and the circuit from the batteries runs through the blade 18$^b$, of a switch 18, magnet 19, brush 20, contact disk 21, brush 22, motor 23, the blade 24$^a$, of a switch 24, the closed armature 50, magnet 10, magnet 8, switch blade 18$^a$ of the switch 18 and back to batteries 17; thereby not only energizing the throttle, air line and clutch magnets to hold such parts in operative position, but also operating the motor 23 which drives the flasher through the following mechanism:

The motor 23 has a shaft 27 provided with a worm 28, which meshes with the worm wheel 29.

Located adjacent the worm wheel is a flasher having a shaft 31, mounted in bearings 31' provided with a clutch 32, that is yieldingly held in operative engagement with the worm wheel by a spring 33, so that when the motor is active the flasher shaft will be revolved.

Fixed on the flasher shaft 31 are antenna ground and switch drums 35, 36 and 58, each having a brush surface in constant contact with its respective antenna brush 37, ground brush 38 and switch brush 25; the antenna brush being connected with the antenna 40 by a wire 41, and the ground brush with the ground 42 by a wire 43.

The receiving circuit comprises brushes 45, 45ª, which make contact with the antenna and ground drums and are connected through the wire 46 and the primary 47 of the tuning coil 48, so that when a circuit is closed between the antenna 40 and ground 42 through primary 47; electrical energy flowing through the primary 47 of the tuning coil 48 may pass by induction to the secondary 49 thereof.

The antenna and ground drums each have a sending segment 52 integral therewith, adapted for contact with brushes 53 and 54, so that during a relatively short period in the revolution of the flasher shaft and antenna, ground and switch drums, the sending brushes will make contact with their respective segments to complete a circuit through the sending apparatus, mechanism (not shown) being provided for lifting the receiving brushes during the sending periods.

While the periods may vary, as desired, as an illustration, they may be in the ratio of nine-tenths of a second of receiving to one-tenth of a second of sending, so that for nine-tenths of every second the apparatus is in condition for receiving waves from a sending apparatus of another locomotive, or from a fixed station, and once every second the apparatus will send out waves to be received by the apparatus likewise arranged on another locomotive within the danger zone.

It is apparent that as each locomotive equipped with the apparatus is in condition almost continuously to receive waves, and is sending waves at least once every second, the receiving instrument of a coöperating apparatus will be operated practically at once upon its entering the danger zone of a coöperating apparatus, so that the locomotive will be automatically stopped before it can collide with another locomotive, or the like, or run through an open switch, equipped with my apparatus.

The sending circuit differs from the receiving circuit, in that each sending circuit is wholly within each individual apparatus and is operated independently of waves emanating from an independent source; each sending circuit comprising—starting from the batteries 17—the switch blade 18ª of switch 18, primary side of spark coil 56, brush 57, sending drum segment 58′, of drum 58, brush 25, switch blade 24ᵇ of switch 24, switch blade 18ᵇ of switch 18, to batteries 17, and from the secondary side of the spark coil 60, spark gap 61, across which is shunted condenser 62, wire 63, brush 53, segment 52 of drum 35, brush 37, wire 41, antenna 40 and from the other side of the spark gap 61, through wire 64, brush 54, segment 52 of the drum 36, brush 38, wire 42 to ground 42, so that once during each revolution of the flasher shaft, current flows through the circuit just traced and thus sends out Hertzian waves from the apparatus.

With the parts constructed and arranged as described, should two locomotives traveling in opposite directions approach each other to within the dangerous radius or zone of the apparatus mounted on the locomotives, within a second after they have entered such zone, the transmitting energy on each locomotive will be created and waves sent therefrom and received by the apparatus on the other locomotive. As soon as the waves sent by one apparatus affect the receiving circuit of the other apparatus within the same dangerous zone, electrical energy from antenna 40, passing through the primary 47 of the tuning coil 48, is transferred by induction to the secondary 49 of the tuning coil 48, and thereby energize the receiving set, one form of which comprises the following instrumentalities:

The circuit line 67′ from the tuning coil 49 leads through a condenser 69, by means of a flexible conductor, to a contact member 66 at one terminal of the coherer 70, so that when a Hertzian wave is received from a coöperating apparatus, the filings within the coherer mass or cohere, thus completing a circuit through the coherer, so that current may flow through the coherer to a contact member 71 to the other terminal of the circuit wire 77, back to the opposite end of the tuning coil 49; the contact members 66 and 71 being in operative position while the apparatus is in receiving condition, but drawn away from the coherer by the magnets 66′ and 71′ immediately prior to the sending period, and held out of operative position by the magnets until after the sending period has been completed.

When the circuit is closed through the coherer 70, current also flows from batteries 75, through choke coil 73, polarized relay 74, choke coil 76, contact 71, coherer 70, contact 66, wire 72 and back to battery 75, energizing the polarized relay 74, so that its armature 79 is drawn over into contact with the point 80.

When the relay armature 79 makes contact with the point 80, a circuit is closed through the armature 79, wire 82, battery 84, magnet 85 and back to contact point 80, thereby closing a circuit through the magnet 85.

As soon as the circuit is closed through the magnet 85, the latter is energized and lifts the armature 50 from the contact point 88, and breaks the circuit from the main battery through the motor, and through the throttle, air-valve and clutch magnets.

When the circuit is broken through the magnets 8 and 10, the armature 6 rocks freely on its fulcrum mounting 65, so that the spring 2 draws the throttle lever inwardly and the lever 3 fulcrums at the handle end, if the engineer happens to be manipulating the throttle at the instant the main battery circuit is broken, otherwise the lever 3 and rod 1 move inwardly as a whole.

Simultaneously with the releasing of the throttle, the magnet 10 is deënergized and releases the air line valve lever, so that the valve opens and releases the air in the train pipe so that the brakes set automatically.

With the throttle closed and the brakes set, the locomotive and train quickly come to a stop, and as the action is practically simultaneous on both locomotives, they are both stopped before there is any danger of collision, the radius of the danger zone being greater than the greatest distance the locomotives and trains can move after the throttle is closed and the brakes set.

In order to start the locomotives, after being stopped as described, it is necessary for the armature 6 and air valve to be reset, and in order to reset the throttle and air valves it is necessary to again close the main battery circuit.

In order to close the main battery circuit, it is necessary to decohere the filings in the coherer. One means for decohering the filings comprises a striking arm 91, which is mounted in position for striking the metallic coherer case 83 to decohere the filing therein, and is operable by a magnet 92, having a terminal wire 93 running to a battery 94 that connects with a latch lever 95, one arm 96 of which is weighted to throw the lever arm 97 under the armature 50 when the latter is drawn to magnet 85 to lock the main battery circuit open. The lever 95 also has an arm 98 provided with a button 99 adapted for actuation by the engineer to rock the lever arm 97 to position for releasing the armature 50.

The lever 95 is balanced so that when the arm 97 engages the end of the armature 50, the arm 98 is out of contact with a point 100, that has a wire 101 leading to the magnet 92, thus allowing the circuit through the magnet 92 to remain broken.

After the magnet 85 has been energized, and it is again desired to start the train, the engineer presses the button 99 to move the arm 97 out of the path of the armature 50, so that the spring, or other means, 102 may pull the armature to contact with the point 88, and to bring the arm 98 and point 100 into contact so that a circuit is closed through the magnet 92. When the magnet 92 is energized, the arm 91 strikes the case 83 to decohere the filings in the coherer and thereby break the receiving circuit, so that the magnet 85 is deënergized and releases the armature 50, allowing the latter to be drawn into contact with the point 88 and reclose the main battery circuit; the deenergization of the magnet 85 being accomplished by return of the armature 79 of the polarized relay to initial position when the relay circuit is broken within the coherer. With the main battery circuit closed, the throttle and air line valves may be set and the train operated as before.

The lever 95 is preferably provided with a seal (not shown), so that when the engineer wishes to again start his train, after its being automatically stopped through the operation of the previously described receiving apparatus, it is necessary for him to break the seal, so that he may push the button 99 to energize the magnet 92 and operate the decoherer and release the armature member 50.

I provide the sealed lever 95 in order that when a locomotive is inspected after its run, the inspector may require a statement from the engineer regarding the reasons for the use of the decohering apparatus.

The coherer which I prefer in my system is of the filing type and inclosed within the metallic case 83 which is adapted for excluding waves or sparks originating or produced in the local sending element from effecting the filings within the coherer.

The case 83 is preferably tubular and provided with fiber end bushings 105 in brass heads within which the contact members 66 and 71 are adapted to travel, the inner ends of the members being tipped with silver, or any good contact material, to contact a fixed member on the coherer, and the outer ends having iron heads 108 adapted for attraction by the magnet 66' or 71' to draw the contact members 66 and 71 away from the coherer against the tension of the springs 109 and thereby break the circuit through the coherer.

In order to energize the magnets 66' and 71' at the proper time, and for the proper period relative to the sending and receiving periods, I run wires 111 from one end of each magnet to the switch arm 18ª and wires 112 to a brush 114, which is adapted to contact a segment 115 on the switch drum 58, which is connected with the opposite terminal of the main battery through brush 25, blade 24ᵇ of switch 24, and blade 18ᵇ of switch 18.

The segment 115 is longer than the segment 58', so that the brush 114 contacts the segment 115 before the segment 58' is contacted by the brush 57 and holds the contact longer. By this means the magnets 66' and 71' are energized to draw the coherer contacts out before the sending instruments are energized and remain drawn for a short space of time after the sending period has been completed; thereby entirely avoiding any possibility of the local receiving outfit being interfered with by the waves originating in the local sending outfit.

In order to absorb contact sparks between brush 114 and segment 115, I provide a condenser, or the like, 120, which is shunted between brushes 114 and 25.

It is apparent that unless further provision is made, the flasher is as apt to stop in a receiving position as in a sending position, and that in case it should stop in receiving position the safety apparatus would afford no protection to the other train, or to a third or any subsequent train. It is not advisable, however, to discontinue sending the waves when the locomotives have stopped, for the reason that other locomotives coming along the same track might collide therewith, and in order to obviate such a result, I provide a means for stopping the flasher in the sending position following the breaking of the main battery circuit which comprises the following mechanism.

Projecting laterally from the clutch disengaging member 122, which is pivotally mounted on bearing 31', is an inclined head 122' having a base seat 122'', which is held normally out of engagement with the clutch 32 by a magnet 19, but which is yieldingly tensioned toward the same by a spring 33' that is secured to the member 122 and to the bearing 31'.

The clutch is feathered on the shaft 31 and is provided with a pin 32', which is held yieldingly in an aperture 29' in the worm gear 29 by the coil spring 33', so that as the worm gear revolves under the influence of motor 23 the flasher will be revolved therewith.

Simultaneous with the breaking of the circuit through the magnets 8 and 10, the circuit of the magnet 19 is broken, thereby releasing the member 122, so that the inclined head 122' moves into the path of the clutch member 32. The motion of the gear 29 revolves the clutch member 32 against the inclined head 122' and thus moves the clutch against the tension of the spring 33 and causes it to rest on seat 122'', thereby disengaging the pin 32' from the aperture 29' and stopping the flasher in sending position.

As a preliminary to the stopping of the flasher in the sending position, I construct the flasher, so that when the clutch 32 is moved out of contact with the motor worm wheel 29 by the disengaging clutch member 122, the drums 35, 36 and 58 will move automatically to such position that the receiving contacts are broken and the sending contacts made and will be held in that position, thus continuing the sending out of Hertzian waves to all trains attempting to enter the danger zone.

Assuming that a locomotive carrying the apparatus has been automatically stopped, as described, by its having entered the danger zone of another train, it is apparent, as heretofore described, that when the circuit is broken through the coils 8 and 10 respectively, the circuit is also broken through the magnet coil 19 and the motor 23, the magnet coil 19 being deënergized, a taut spring 33' pulls the disengaging clutch member 122, which fulcrums at the hinge 123, between the clutch 32 and the worm wheel 29, thus disengaging the worm wheel 29 from a fixed position on the flasher shaft 31 and stopping the revolution of the flasher in a fixed position. The fixed position is the position previously described for the sending out of Hertzian waves and the disengaging of the receiving brushes, as it is apparent that it would no longer be necessary to receive incoming Hertzian waves after the receiving instruments have once broken the magnet circuit through the magnets 8, 10, 19 and the motor 23. The apparatus will remain in the sending position as above described, with the steam cut off and the brakes set until the position of the switch 24 is changed on the other locomotive or locomotives within whose danger zone it is, and the lever 95 rocked as described in a foregoing paragraph.

The governor 125 is provided on the shaft 27 to regulate the speed of motor 23, thereby maintaining a constant speed for the purpose of keeping the sending and receiving period constant and thus obviating any chance of synchrnoism between the apparatus on different locomotives. When the motor exceeds a certain predetermined speed, the contact disk 21 on the governor 125 is pulled out of contact with brushes 20 and 22 by the centrifugal force of the governor balls 126, so that a circuit is completed from batteries 17 through switch blade 18$^b$, clutch magnet 19, governor resistance 127, brush 22, wire 128, motor 23, switch blade 24$^a$, armature 50, magnets 10 and 8, switch blade 18$^a$, of switch 18, and back to batteries 17, thus reducing the electrical energy of the circuit sufficiently to lower the speed of the motor but not sufficiently to interfere with the working of the magnets 10, 8 and 19.

It is apparent that it is frequently necessary for trains to come into close proximity to each other, such as when they are entering stations, or the like, and that means should be provided for preventing operation of the apparatus under such circumstances. For this purpose I provide the switch 24, having the blades 24$^a$, 24$^b$, 24$^c$, 24$^d$ and their usual blade posts, and having the blades of switch 24 of such construction that when the switch is turned from one position to the other there is an instant when the blades are in contact with both the main and auxiliary posts.

With this construction, when the switch is turned to cut off the motor by disengaging the main blades 24$^a$ and 24$^b$ from their respective posts, the auxiliary blade 24$^c$ makes contact between posts 129 and 130 and the auxiliary blade 24$^d$ makes like contact between posts 131 and 132, before breaking contact with the posts of the normal position of switch 24, so that while the main battery circuit is normally closed as described; from battery 17, through blade 18ᵇ of switch 18, magnet 19, brush 20, contact disk 21, brush 22, motor 23, blade 24ᵃ of switch 24, the closed armature 50, magnet 10, magnet 8, blade 18ᵃ of switch 18 and back to battery 17, a new circuit is formed from the batteries 17 through switch blade 18ᵇ of switch 18, post 131, blade 24ᵈ, post 132 of switch 24, wire 128, shunt resistance coil 134, switch post 130, blade 24ᶜ, post 129 of switch 24, armature 50, magnet 10, magnet 8, switch blade 18ᵃ of switch 18 and back to batteries 17, and thus maintaining the circuit through the air brake and throttle magnets and through the shunt resistance coil 134 taking the place of the motor and magnet coil 19, thus continuing to energize the magnets 8 and 10 to prevent influencing the travel of the locomotive and allowing the sending as well as the receiving apparatus to be cut off, and thereby obviate automatic operation of the apparatus, when the locomotive carrying the apparatus is moving into a station, or other locality, where it is necessary for trains to travel in close proximity to each other.

With this construction, the switch 24 may be turned when the locomotive carrying the apparatus is about to enter a station, or other like place, so that the sending waves may be discontinued and thereby obviate unnecessary interruption of the travel of locomotives within the station or similar zone.

I also provide means for manually cutting off the main battery circuit and deënergizing magnets 8 and 10 should the throttle or engineer's air-brake valves become inoperable through accident; or when the locomotive is idle while the circuits are being tested or the batteries charged, comprising the switch 18, heretofore mentioned in connection with various other circuits; it being apparent that when contact of the switch blades with their posts is broken the main batteries are cut out, and that the throttle and air line magnets are thereby deënergized.

While I have described the apparatus as adapted for use on locomotives, or the like, it is apparent that sending apparatus may be mounted at switch points, towers, etc., or crossings where collisions with public carriers are possible, and that the apparatus may be modified for use aboard ship, at lighthouses, and various other points where its use may be desirable.

Having thus described my invention, what I claim as new therein, and desire to secure by Letters-Patent, is:—

1. The combination with a main battery circuit including a plurality of magnets, of a wireless apparatus including a coherer, a metal case surrounding said coherer; a polarized relay in the circuit of the coherer, means for making and breaking said circuit within the metal casing, an auxiliary battery circuit including an armature in the polarized relay, a contact for said armature, a battery and a magnet, the magnet having an armature in the main battery circuit, whereby the auxiliary battery circuit is closed upon operation of the wireless apparatus, and the main battery circuit opened when the auxiliary circuit is closed.

2. The combination with a throttle valve having a fulcrum lever, of a main battery circuit including a magnet, a pivotally mounted armature for said magnet having a fulcrum seat for the throttle valve lever, and a wireless receiving apparatus for breaking the main battery circuit whereby said magnet is deënergized to release its armature, for the purpose set forth.

3. The combination with an electric circuit, including a magnet, of an armature for the magnet, means under control of the armature for influencing the travel of any power driven vehicle or vessel, a wireless receiving apparatus including a coherer, a second separate or individual circuit including a manually operable decoherer, an auxiliary circuit under control of the receiving apparatus and adapted for breaking the said electric circuit to release said armature, and means for manually energizing the decoherer and for closing the said electrical circuit.

4. The combination with an electrical circuit, including a source of energy and a magnet, of an armature for the magnet, means under control of the armature for influencing travel of any power driven vehicle or vessel, a wireless receiving apparatus including a coherer, a separate circuit for a decoherer, a source of electrical energy for said circuit, an auxiliary circuit under control of the receiving apparatus and adapted to break said electric circuit to release said armature, and manually operable means for closing the decoherer circuit and the aforesaid electrical circuit.

5. The combination with a main electrical circuit, including magnets, of a source of electrical supply for said circuit, armatures for the magnets, a power driven vehicle or vessel whose travel is under control of said armatures, wireless receiving instruments including a coherer, a decoherer, a separate and independent circuit for said decoherer, a source of electrical supply for said circuit, a separate circuit under control of the receiving instruments and adapted, under certain conditions, to deënergize the main electrical circuit and release said armatures, and manually releasable mechanism for completing the main electrical and decoherer circuits.

6. The combination with means for influencing travel of a motor, of a battery circuit including a member for controlling said means and including a secondary motor, a flasher operable by the secondary motor, wireless sending and receiving apparatus having electrical circuits adapted for alternate closing by means of the flasher, and a shunt circuit for maintaining the main battery circuit when the latter is cut out through the motor.

7. The combination with means for influencing travel of a motor, and a main battery circuit including a motor and including means for controlling the vehicle influencing means, a flasher operable by said last named motor and including antenna and ground drums, wireless receiving and sending apparatus having circuits including brushes and flasher drums, means on the flasher adapted for coöperation with the said drums to close a circuit through the sending apparatus, a shunt circuit for cutting out the last named motor without breaking the main battery circuit, and a switch for controlling the shunt circuit.

8. The combination with means for influencing travel of a primary motor and a main battery circuit including a secondary motor and including means for controlling the primary motor influencing means, a flasher operable by said secondary motor and including antenna and ground drums, wireless receiving and sending apparatus having circuits including brushes and flasher drums, means on the flasher adapted for coöperation with the said drums to close a circuit through the sending apparatus, a shunt circuit for cutting out the secondary motor without breaking the main battery circuit, and a switch for controlling the shunt circuit and whereby the shunt circuit is closed before the main circuit, through the secondary motor, is broken.

9. The combination with means for influencing travel of a primary motor, of a secondary motor, including a governor and a resistance coil, a main battery circuit including the primary motor influencing means, the secondary motor and the governor, a wireless receiving apparatus for controlling the main battery circuit, and a shunt circuit adapted for maintaining flow of current through the main battery circuit when the main battery circuit is broken at the motor governor and the current forced through the motor resistance coil.

10. The combination with means for influencing travel of a primary motor, of a secondary motor including a governor and a resistance coil, a main battery circuit including the primary motor influencing means, the motor and the governor, a wireless receiving apparatus for controlling the main battery circuit, a shunt circuit adapted for maintaining flow of current through the main battery circuit when the main battery circuit is broken at the motor governor and the current forced through the motor resistance coil, and a switch adapted for breaking the main battery circuit and closing the shunt circuit and whereby both circuits are closed at an intermediate period to obviate breaking of the entire battery circuit.

11. The combination with means for influencing travel of a primary motor, of a main battery circuit including a magnet for controlling said means and including a secondary motor and its governor, a magnet and brushes included in the circuit, a flasher operable by the motor, means under control of the magnet for disconnecting the flasher from said motor, a shunt circuit including a resistance coil adapted for maintaining the battery circuit closed when the main circuit through the brushes is broken, and means for breaking the circuit through the brushes and making the circuit through the resistance coil.

12. The combination with means for influencing travel of a motor, of a main battery circuit including a magnet for controlling said means, a wireless sending and receiving apparatus for breaking the main battery circuit and including separate antenna and ground drums having sections adapted for alternate contract by brushes in the wireless sending and receiving apparatus.

13. The combination with means for influencing travel of a vehicle, of a main battery circuit for controlling said means, a wireless receiving apparatus for controlling the main battery circuit, a wireless sending apparatus, circuits including the wireless sending and receiving apparatus, a flasher adapted for closing and opening the sending and receiving apparatus circuits alternately and for automatic movement to sending position when freed from its driving member, a driving member included in the main battery circuit and adapted for actuating the flasher, and a shunt circuit for maintaining the main battery circuit when the latter is broken through the driving member.

14. The combination with means for influencing travel of a motor, of a main battery circuit including a magnet for controlling said means, a wireless receiving apparatus for breaking the main battery circuit, a manually operable member for reestablishing the main battery circuit, and means connected with said member for locking the main battery circuit open.

15. The combination with means for influencing travel of a motor, of a main battery circuit including an armature, an auxiliary circuit including a magnet for the armature, wireless receiving apparatus for energizing the magnet to break the main battery circuit, mechanism for locking the armature to retain the main battery circuit open, and a manually operable member for breaking the magnet circuit and releasing said armature.

16. The combination with a main battery circuit, of a wireless receiving set comprising a coherer having suitable terminals, an auxiliary circuit having slidable terminals adapted to contact with the coherer terminals and means for yieldingly retaining said sliding terminals in operative relation to the coherer, means in the auxiliary circuit for breaking the main battery circuit, a decoherer, and manually operable means for establishing a circuit through the decoherer.

17. The combination with a main battery circuit, of a wireless receiving set comprising a coherer having suitable terminals, an auxiliary circuit having slidable terminals adapted to contact with the coherer terminals and means for yieldingly retaining said sliding terminals in operative relation to the coherer, means in the auxiliary circuit for breaking the main battery circuit, a decoherer and manually operable means for establishing a circuit through the decoherer, and means for moving said sliding terminals to inoperative position against the tension of their normal yielding means.

18. The combination with a main battery circuit, of a receiving outfit for breaking the main battery circuit and including a coherer having movable contacts normally yieldingly retained in operative position, a local sending outfit, a circuit including magnets for drawing the coherer contacts to inoperative position, and means for closing a circuit through the sending outfit and said last named magnets.

19. The combination with a main battery circuit, of a wireless apparatus comprising a coherer, a metallic case inclosing the coherer and adapted for choking local waves, non-conductive heads in said case, provided with apertures an auxiliary circuit, contact members adapted for projection into or withdrawal from the case through the head apertures, magnets operable from the auxiliary circuit for actuating said contact members, a third circuit, a decoherer in said third circuit adapted for tapping said metallic case, and means for manually closing said third circuit to actuate said decoherer.

20. The combination with means for controlling the travel of a power driven vehicle or vessel, of a source of electrical supply for said means; a main magnet circuit including an armature, an auxiliary circuit including a magnet for the armature; wireless receiving apparatus including a coherer; a decoherer having control of said circuits; mechanism for automatically locking the armature to retain the main magnet circuit open; manually operable means for releasing said armature; means for compelling said armature to close the main magnet circuit, and means for operating said decoherer.

21. The combination with means for influencing the travel of a power driven vehicle or vessel, of a main electrical supply circuit; a second circuit including a magnet and an armature; a third circuit including a magnet for the armature; a fourth circuit including a polarized relay and a coherer adapted, under certain conditions, to produce energization of the third circuit; wireless receiving apparatus, including accessories, and adapted for energizing the third circuit and thereby break said second circuit when said coherer is affected by the transmitter of a like apparatus; a decoherer; a fifth circuit for energizing said decoherer, mechanism for automatically locking the armature to retain the second circuit open, and manually operable means for actuating a switch to close the decoherer circuit and release said armature.

22. The combination with a main electrical supply circuit, of a plurality of apparatus each mounted upon a collidable object and adapted to automatically prevent collisions, each apparatus comprising in part, wireless receiving instruments having a coherer, contact members for the coherer, a metallic case surrounding said coherer, means for disengaging said contact members from the coherer during the transmitting periods of the apparatus, and auxiliary circuits adapted to perform various functions relative to the actuation of the automatic stop apparatus.

23. A combination of apparatus arranged for automatically preventing collisions between two or more mechanically driven vehicles or vessels each equipped therewith, and each apparatus comprising, in part, wireless transmitting apparatus and corresponding energy adapted to energize the receiving instruments of a like apparatus when two or more such vehicles or vessels so equipped, in approaching each other, come within distances previously determined, a suitable receiving instrument controlling the movement of the vehicle or vessel upon which the apparatus is mounted, a circuit for such receiving instrument, a metallic case inclosing such receiving instrument, save for the insulated bushings, contact members adapted for travel in said insulated bushings, a circuit for the contact members, and means for automatically reciprocating said contact members to alternately contact the aforesaid receiving instrument and withdraw therefrom.

24. A combination of apparatus constructed and arranged to automatically prevent collisions between any two or more power driven vehicles or vessels equipped therewith, comprising Hertzian wave instruments having control of the movements of vehicles or vessels so equipped, an antenna to ground circuit for said instruments, an automatic switching apparatus in said circuit, a tuning coil having primary and secondary coils, the primary coil for said antenna to ground circuit, a circuit for the secondary coil of said tuner, a coherer in said circuit, an additional or second circuit for said coherer, a relay in said additional or second circuit, a source of energy for the relay, a case for the coherer, conduits of insulated material or materials for said case, contact members in the coherer circuit, and means for automatically actuating such members, for the purpose set forth.

In testimony whereof I affix my signature in presence of two witnesses.

HARRY D. BETZ.

Witnesses:
ARTHUR W. CAPS,
L. E. COATS.